(12) United States Patent
Bloomfield

(10) Patent No.: US 10,888,806 B2
(45) Date of Patent: Jan. 12, 2021

(54) SCRUBBING BACKWASH FILTER

(71) Applicant: William Bloomfield, British Columbia (CA)

(72) Inventor: William Bloomfield, British Columbia (CA)

(*) Notice: Subject to any disclaimer, the term of this patent is extended or adjusted under 35 U.S.C. 154(b) by 912 days.

(21) Appl. No.: 15/035,603

(22) PCT Filed: Nov. 12, 2014

(86) PCT No.: PCT/CA2014/000809
§ 371 (c)(1),
(2) Date: May 10, 2016

(87) PCT Pub. No.: WO2015/070325
PCT Pub. Date: May 21, 2015

(65) Prior Publication Data
US 2016/0250571 A1    Sep. 1, 2016

Related U.S. Application Data

(60) Provisional application No. 61/903,366, filed on Nov. 12, 2013.

(51) Int. Cl.
*B01D 24/46* (2006.01)
*B01D 24/14* (2006.01)
(Continued)

(52) U.S. Cl.
CPC ....... *B01D 24/4631* (2013.01); *B01D 21/003* (2013.01); *B01D 21/009* (2013.01);
(Continued)

(58) Field of Classification Search
None
See application file for complete search history.

(56) References Cited

U.S. PATENT DOCUMENTS 243,212 A * 6/1881 Clark ................. B01D 35/16
210/796
2,769,547 A * 11/1956 Hirsch ............. B01D 24/4621
210/273
(Continued)

FOREIGN PATENT DOCUMENTS

CA    2278957 A1 *  1/2000  ......... B01D 24/4673
CA    2070933 C  *  7/2002  ......... B01D 24/4631
(Continued)

OTHER PUBLICATIONS

International Search Report and Written Opinion for International Application No. PCT/CA2014/000809, 10 pages (dated Feb. 17, 2015).
(Continued)

*Primary Examiner* — Robert J Popovics
(74) *Attorney, Agent, or Firm* — Brinks Gilson & Lione; John C. Freeman

(57) ABSTRACT

A filter is provided including a vessel having an input positioned near the top of the vessel for contaminated fluid; the vessel containing media; a drain screen; a propeller rotatable on a drive shaft extending downwardly from the top of the vessel; a deflector plate below the drain screen to impel media outwardly from the center of the vessel; a plurality of baffles positioned on side walls of the vessel; and a drain to remove fluid from the vessel.

4 Claims, 15 Drawing Sheets

(51) Int. Cl.
*B01D 21/00* (2006.01)
*B01D 21/26* (2006.01)

(52) U.S. Cl.
CPC ....... *B01D 21/0012* (2013.01); *B01D 21/267* (2013.01); *B01D 24/14* (2013.01); *B01D 24/4673* (2013.01)

(56) References Cited

U.S. PATENT DOCUMENTS

| | | | | |
|---|---|---|---|---|
| 3,039,612 A * | 6/1962 | Palmer | | B01D 24/205 210/272 |
| 3,276,590 A * | 10/1966 | Schmid | | B01D 24/14 210/206 |
| 3,402,126 A * | 9/1968 | Cioffi | | B01J 47/04 521/26 |
| 4,105,555 A * | 8/1978 | Pease | | B01D 24/14 210/136 |
| 4,161,963 A * | 7/1979 | Stevens | | B01D 24/14 137/592 |
| 4,219,414 A * | 8/1980 | Crits | | B01J 47/10 210/663 |
| 4,496,464 A * | 1/1985 | Hensley | | B01D 24/105 210/269 |
| 5,126,042 A * | 6/1992 | Malone | | C02F 3/10 210/150 |
| 5,171,443 A * | 12/1992 | Bratten | | B01D 24/14 210/280 |
| 5,290,458 A * | 3/1994 | Bratten | | B01D 24/14 210/796 |
| 5,445,740 A * | 8/1995 | Malone | | C02F 3/06 210/618 |
| 5,573,663 A * | 11/1996 | Junius | | B01D 24/002 210/189 |
| 5,750,028 A * | 5/1998 | Frisch | | C02F 3/1226 210/618 |
| 5,788,842 A * | 8/1998 | Frisch | | C12M 33/14 210/618 |
| 5,811,259 A * | 9/1998 | Hall | | C12M 23/34 210/903 |
| 5,945,005 A * | 8/1999 | Junius | | B01D 24/004 210/786 |
| 6,059,967 A * | 5/2000 | Field | | B01D 24/4631 210/247 |
| 6,287,474 B1 * | 9/2001 | Dean | | B01D 24/12 210/276 |
| 6,365,044 B1 * | 4/2002 | Crane | | B01D 35/30 210/248 |
| 7,022,230 B2 * | 4/2006 | Imai | | B01D 24/405 210/289 |
| 7,097,766 B2 * | 8/2006 | Moya | | B01D 24/14 210/272 |
| 7,329,350 B2 * | 2/2008 | James | | C02F 3/087 210/616 |
| 8,012,359 B2 * | 9/2011 | Parkinson | | B01D 24/047 210/786 |
| 8,110,116 B2 * | 2/2012 | Mimura | | B01D 24/4631 210/792 |
| 9,174,149 B2 * | 11/2015 | Lee | | B01D 24/4631 |
| 9,573,082 B2 * | 2/2017 | Mimura | | C02F 1/64 |
| 9,809,791 B1 * | 11/2017 | Hall | | C12M 27/18 |
| 9,890,354 B1 * | 2/2018 | Hall | | C12M 29/00 |
| 2004/0195162 A1 * | 10/2004 | Imai | | B01D 24/14 210/289 |
| 2010/0320159 A1 * | 12/2010 | Lee | | B01D 24/4631 210/792 |
| 2013/0032517 A1 * | 2/2013 | Renaud | | C02F 1/004 210/167.13 |
| 2016/0250571 A1 * | 9/2016 | Bloomfield | | B01D 24/14 210/774 |

FOREIGN PATENT DOCUMENTS

| | | | | |
|---|---|---|---|---|
| CA | 2689047 A1 * | 8/2008 | | B01D 24/14 |
| CA | 2278957 C * | 11/2009 | | B01D 24/4673 |
| CA | 2689047 C * | 1/2013 | | B01D 24/14 |
| CA | 2870552 A1 * | 5/2016 | | B01D 24/4673 |
| EP | 0519408 A1 * | 12/1992 | | B01D 24/4673 |
| EP | 0976437 A2 * | 2/2000 | | B01D 24/12 |
| EP | 0976437 A3 * | 6/2000 | | B01D 24/12 |
| EP | 2175953 B1 * | 12/2014 | | B01D 24/14 |
| GB | 2486354 B | 11/2012 | | |
| WO | WO 88/04951 A1 | 7/1988 | | |
| WO | WO-9906530 A1 * | 2/1999 | | C12M 27/20 |
| WO | WO-2008100245 A2 * | 8/2008 | | B01D 24/4631 |
| WO | WO-2015070325 A1 * | 5/2015 | | B01D 24/4673 |

OTHER PUBLICATIONS

Kashaev, et al., "Deep Bed Nutshell Filter Evolution", retrieved from http://www.exterran.com/Content/Docs/Products/Deep-Bed-Nutshell-Filter-Evolution-English-A4.pdf, Reprint of paper presented at the 20th Annual Produced Water Society Seminar, League City, Texas, 15 pages (2010).

Petreco Hydromation Nut Shell Filter (brochure), Cameron, USA, 2 pages (Oct. 2013).

* cited by examiner

Solids drain system

Solids drain system with sump

SCRUBBING BACKWASH FILTER

RELATED APPLICATIONS

This application is a 371 national phase of International Application No. PCT/CA2014/000809, filed Nov. 12, 2014, and claims the benefit under 35 U.S.C. § 119(e) of U.S. Provisional Patent Application No. 61/903,366, filed Nov. 12, 2013, the disclosures of which are hereby incorporated by reference in their entirety.

FIELD OF THE INVENTION

The system and method according to the invention relate to filters, and more particularly to filters for scrubbing backwash.

BACKGROUND OF THE INVENTION

Scrubbing backwash filters, or oil removal filters (ORF) as referred to in the oil and gas industry, were developed in the 1970s. The original media used within these filters was made of plastic, but when, in the mid-1970s, as oil prices increased, thereby raising plastic prices, other media that could withstand the highly aggressive agitation of the backwash were considered. Many types of media were tried, including peach pits, coconut husks and other organic media, but eastern black walnut shells became the preferred media due to their high modulus of elasticity allowing the shell fragments to survive the high shear forces created in the 1970s centrifugal slurry backwash pumps.

In the 1990s, a mixer was used instead of a slurry pump, so as a result the shear forces on the media were reduced and the use of other media types became more acceptable. For example, in some cases a native nut media could be used, which was less expensive to ship. Recently the high demand for, and low crop yield of, eastern black walnut shells has resulted in the use of English walnut shells in North America.

Conventional sand filters have also been used, but these fail to adequately scrub the media clean in difficult applications, such as where the sand, garnet, anthracite or mixed media adheres to the sticky/viscous contaminants. An available system uses a slurry pump to scrub the media in a closed loop piping system external to the filter vessel and subsequently, many companies have used this pump slurry method, but have met limited success. Scrubbing backwash filters were introduced in the 1970s and solved the limited reverse flow backwash that had been in use previously. However the scrubbing backwash filters of that era eroded the pump and piping system through which the media flowed and the expensive slurry piping system could become plugged.

The scrubbing backwash filter was refined the early 1990s with a hydro-foil mixer replacing the slurry backwash pump, as described in. U.S. Pat. No. 5,171,443, which also discloses the use of a rotary backwash basket. This device became dominant in Steam Assisted Gravity Drainage (SAGD) systems (in which the oil sands are steamed where they are at deeper levels instead of mining only the shallow sands) and was used in polymer flood applications and challenging industrial applications. The drawback of such systems is complexity and cost. Another scrubbing backwash filter is disclosed in U.S. Pat. No. 6,287,474.

There have been many other backwash filters but many have not attained the commercial success of the filter described in U.S. Pat. No. 5,171,443, due to factors such as durability, cost and commercial acceptance. Some other scrubbing backwash filters are also complex, but many still use a pump and piping system, and have not attained commercial viability. Other prior art includes units with internal augers, that are complex, costly and prone to erosion.

Other devices use a flat bottom screen system to retain the filter media. These systems are expensive if they are engineered and built to handle the differential pressure of a plugged filter bed. The flat bottom systems are prone to contaminant build up and corrosion, and the scale of the screens used in these systems poses a challenge in removing them for cleaning and other purposes. Therefore, another issue with available filters is the difficulty of cleaning the material and sludge that builds up in the retaining screens.

SUMMARY OF THE INVENTION

The system according to the invention is an improved scrubbing backwash filter as described herein.

A filter is provided, including: a vessel having an input for contaminated fluid; the vessel configured to contain media; a drain screen; a propeller rotatable on a drive shaft extending downwardly from the top of the vessel; a deflector plate below the drain screen to impel media outwardly from the center of the vessel; a plurality of baffles positioned on side walls of the vessel; and a drain to remove fluid from the vessel.

The input may be positioned near the top of the vessel. The media may be non-friable or friable. The media may be usable to remove contaminants from the contaminated fluid. The media, when broken, may be removable through a backwash dilution process. The drain screen may be a wedge wire screen sized with openings smaller than the media. The drain screen may act as a retainment screen to prevent the media from moving downwardly in a filtration process. The drain screen may act as a separation screen in a backwash process.

The filter may include first and second downwardly extending baffles from the top of the vessel. The filter may include a baffle at the side of the vessel positioned to deflect backwash media slurry radially outward. The filter may include a screen and a second outlet positioned near the top of the vessel for removal of light contaminants. The second outlet and screen may be sized to allow broken fragments of the media to pass. The filter may include a second propeller to provide increased axial flow. The filter may include a media slurry outlet.

A filter is provided, including: a vessel having an input for contaminated fluid; the vessel configured to contain media; the input expelling the contaminated fluid outwardly from a central position in the vessel; a screen positioned proximate to the side of the vessel; a propeller rotatable on a drive shaft extending downwardly from the top of the vessel; a drain to remove fluid from the vessel.

The filter may include a second drive shaft extending downwardly from the top of the vessel to rotate a second propeller. The filter may have a cyclone positioned within the vessel. The filter may include a heat exchanger positioned within the vessel. The heat exchanger may receive clean fluid from a fluid source and move the clean fluid in a direction generally opposite to that of the contaminated fluid. The filter may clean a surface of the heat exchanger during the backwash process.

A method of filtering contaminants from contaminated fluid is provided, including: flowing contaminated fluid into a vessel containing media, the contaminated fluid entering the vessel through an input positioned near the top of the vessel; passing the contaminated fluid through a drain screen; deflecting the contaminated fluid outwardly using a deflector plate positioned below the drain screen; and draining the fluid from the vessel.

The fluid and media may be moved outwardly using a propeller rotatable on a drive shaft extending downwardly from the top of the vessel. The contaminated fluid may enter the vessel from a central position within the vessel. A cyclone positioned within the vessel may separate the heavy and light contaminants. Media fragments may be removed from the vessel via an outlet near the top of the vessel. The lighter contaminants and media fragments may pass through a second screen prior to removal from the vessel. Discharge of the contaminants or product components may be constant or periodic depending on their concentration.

A method of filtering contaminants from contaminated fluid is provided, including: flowing contaminated fluid into a vessel containing media, the contaminated fluid entering the vessel through an input positioned centrally in the vessel; moving the fluid outwardly from the center of the vessel; passing the contaminated water through a filter media and drain screen; and draining the water from the vessel. The contaminated fluid may pass through a cyclone. The contaminated fluid may pass by a heat exchanger positioned in the vessel. Clean fluid may pass through the heat exchanger in a direction generally opposite to the direction of movement of the contaminated fluid. The surface of the heat exchanger may be cleaned by the media in a backwash process.

DESCRIPTIONS OF THE DRAWINGS

DETAILED DESCRIPTION OF THE INVENTION

Figure 1A:
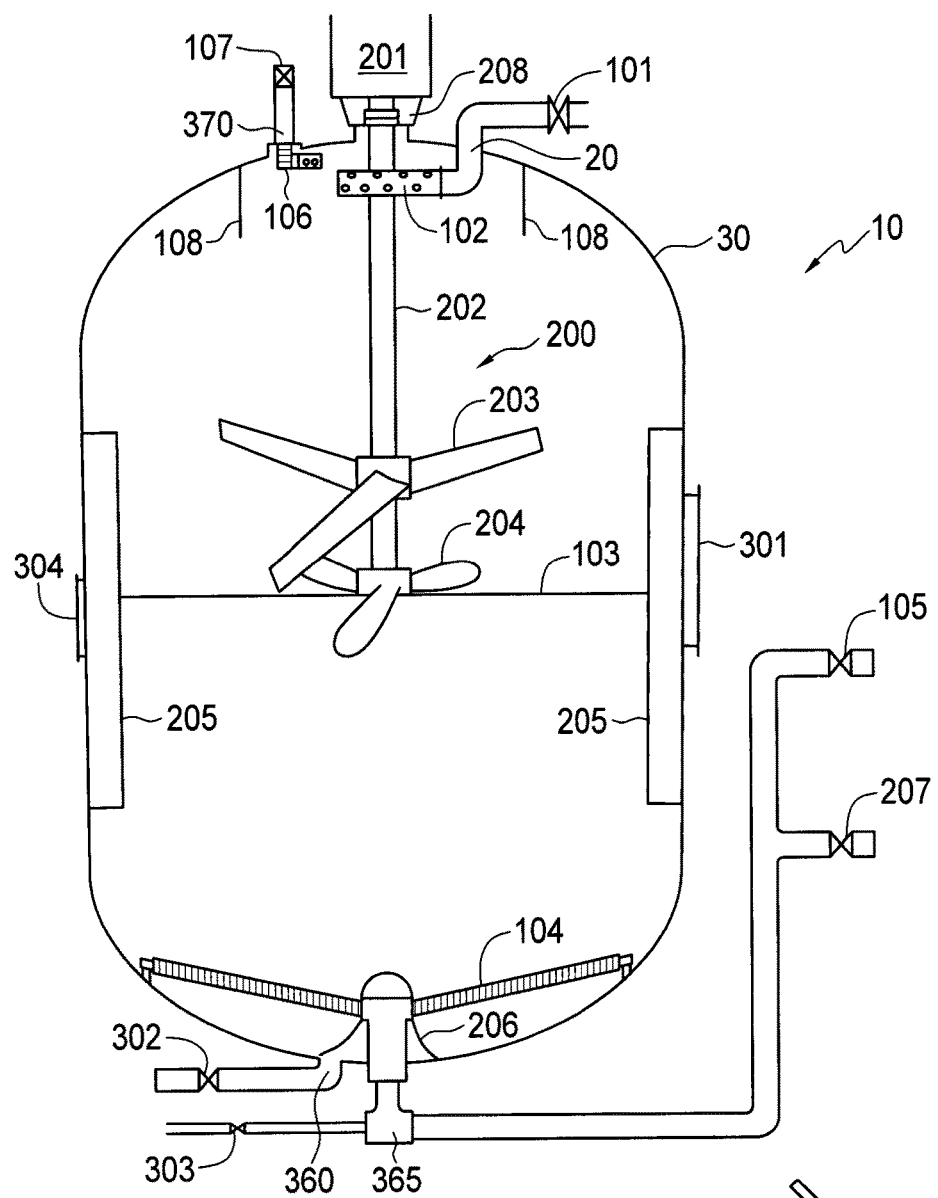
FIG. 1A is a side cross sectional view of a filter system according to the invention showing the internal components thereof.
Figure 1B:
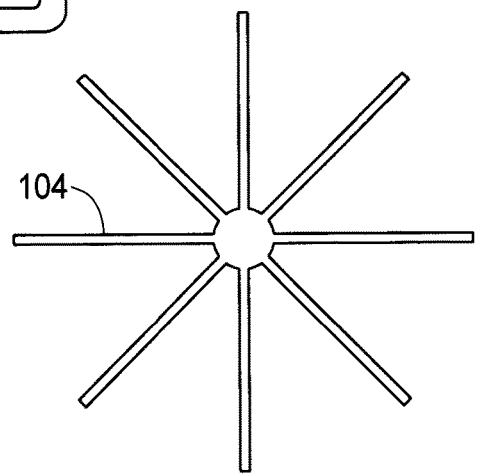
FIG. 1B is a top view of an embodiment of a drain screen for use therein.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective"

characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

Figure 1C:
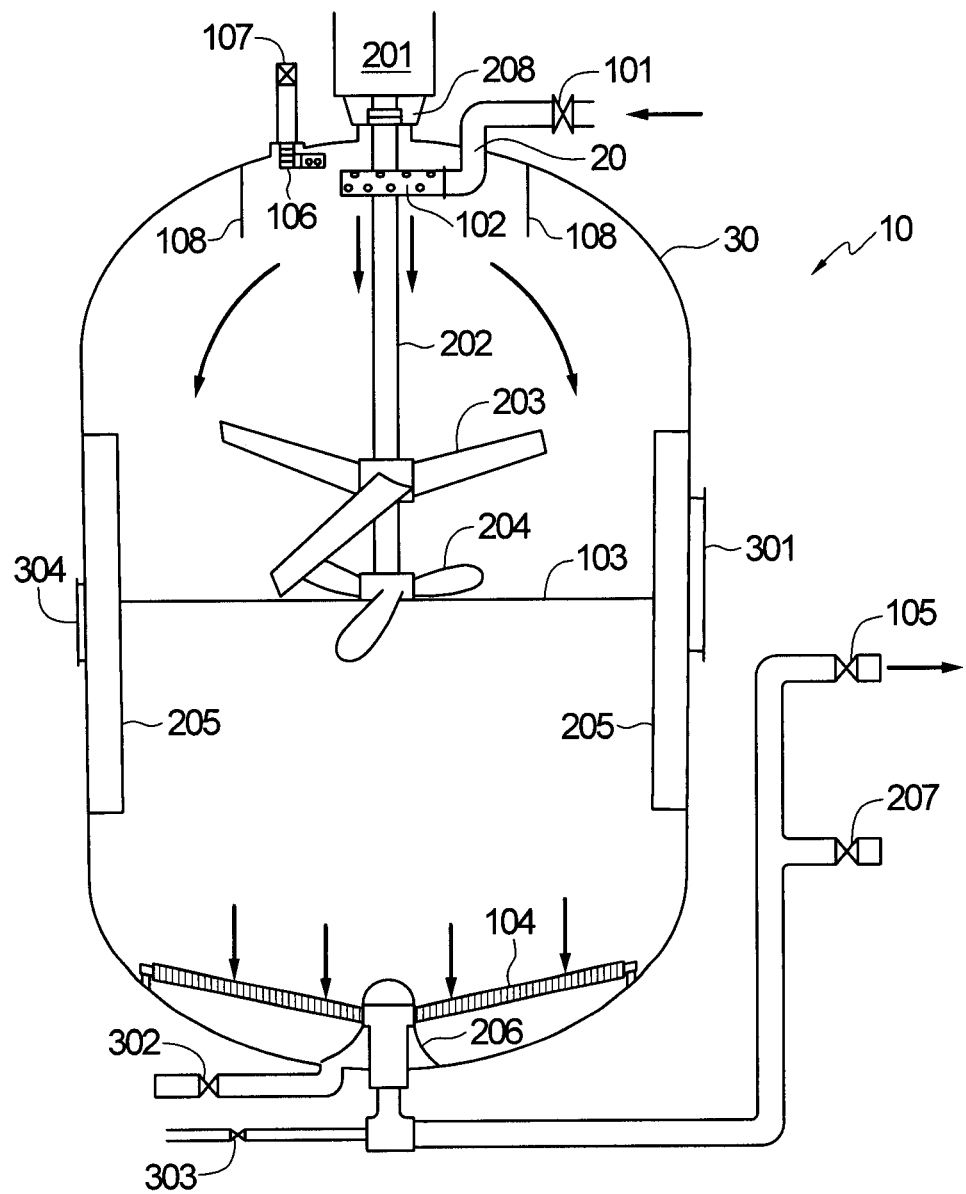
FIG. 1C is a side cross sectional view of the filter system of FIG. 1, showing fluid motion in the filtration process according to the invention.
Figure 1D:
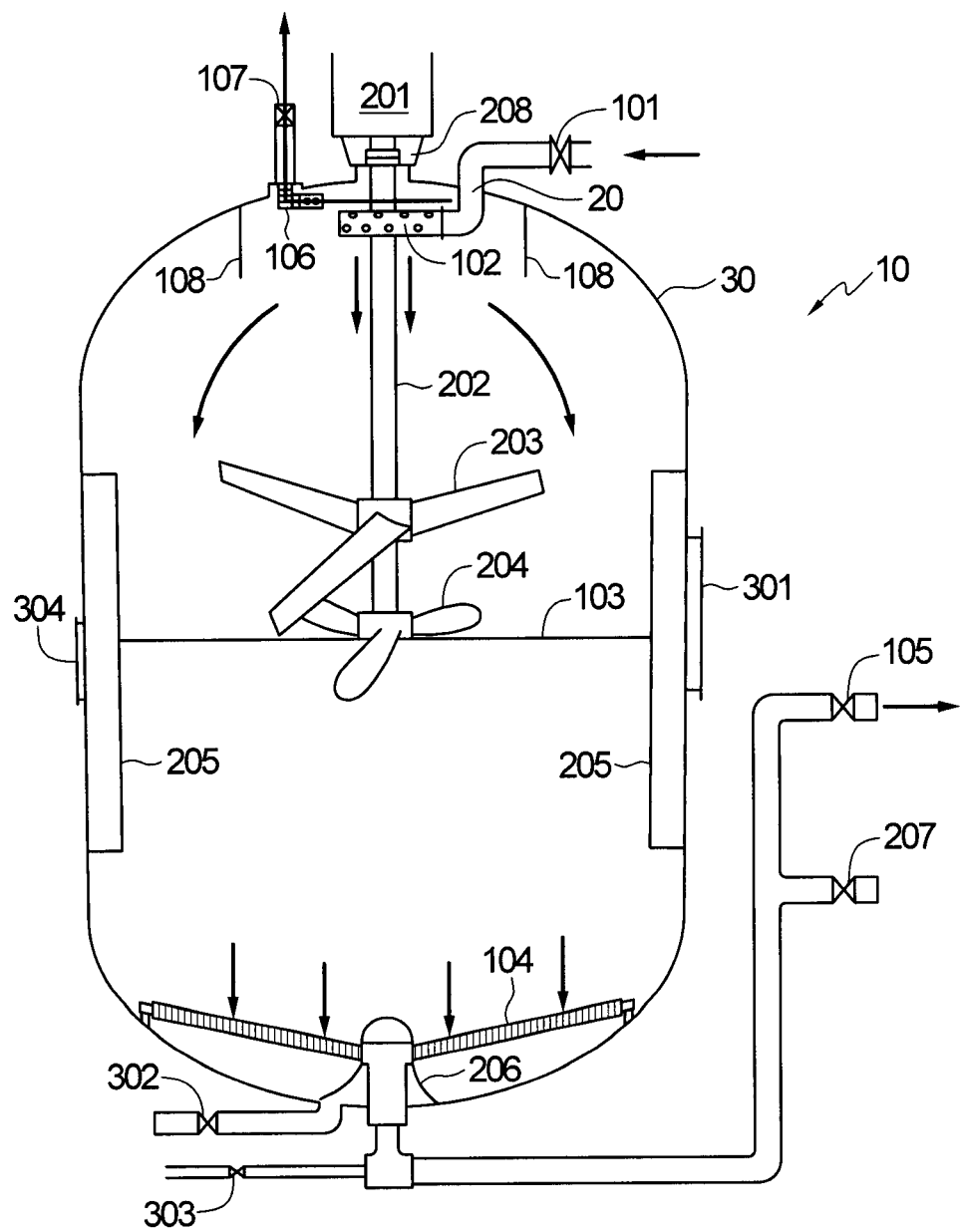
FIG. 1D is a side cross sectional view thereof, showing fluid motion in a filtration process with discharge of light oils and gases according to the invention.
Figure 1E:
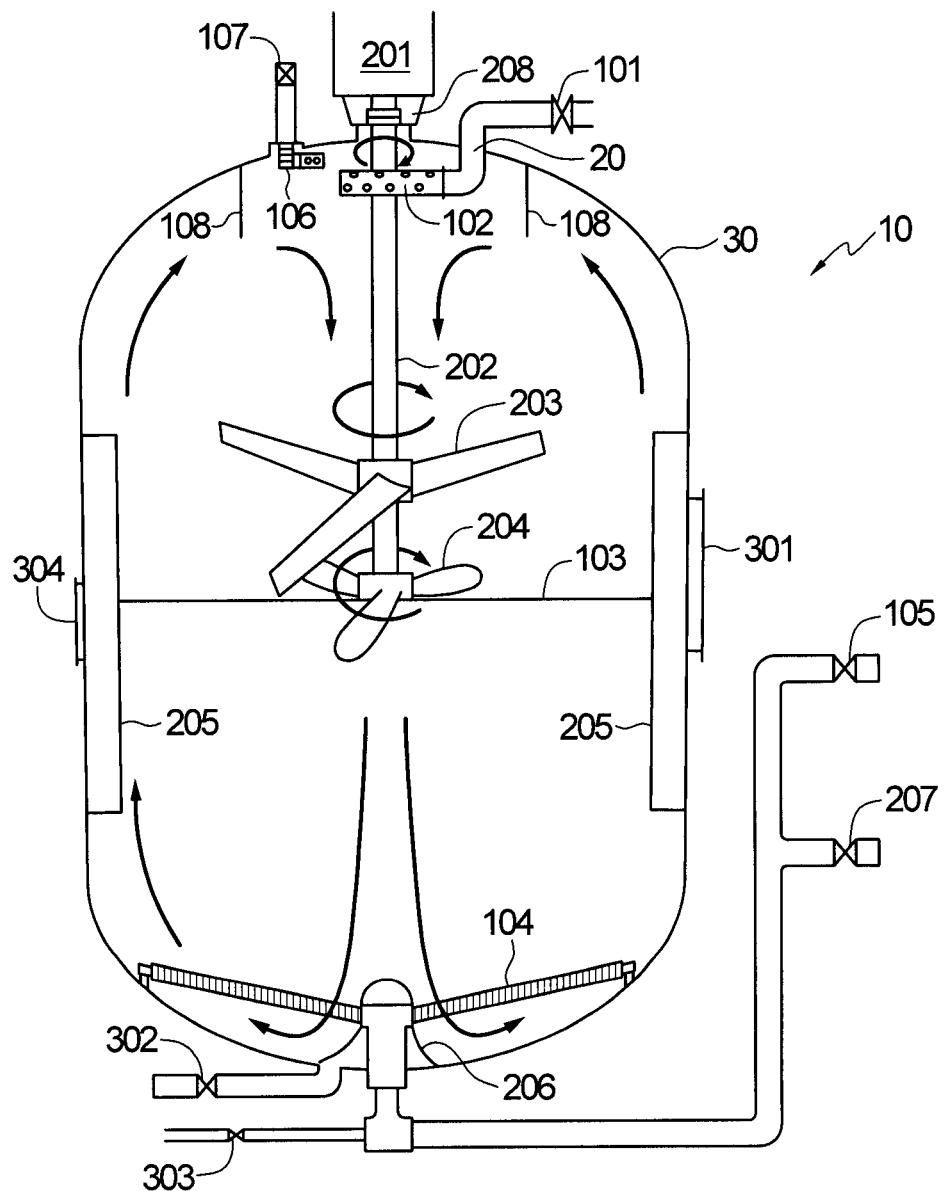
FIG. 1E is a side cross sectional view thereof, showing fluid and media motion in a preliminary filter media scrubbing process according to the invention.
Figure 1F:
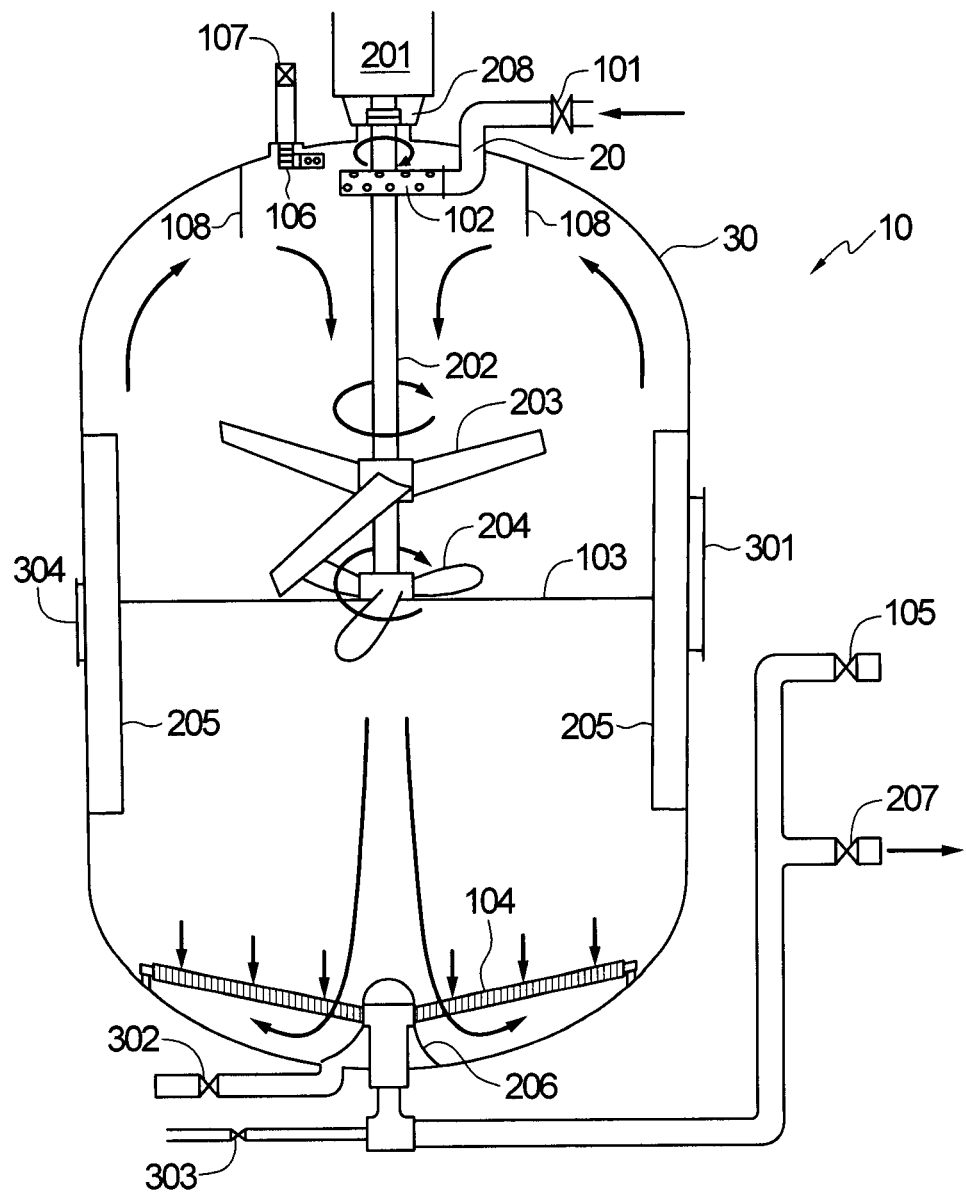
FIG. 1F is a side cross sectional view thereof, showing fluid motion in a backwash dilution process according to the invention.
Figure 1G:
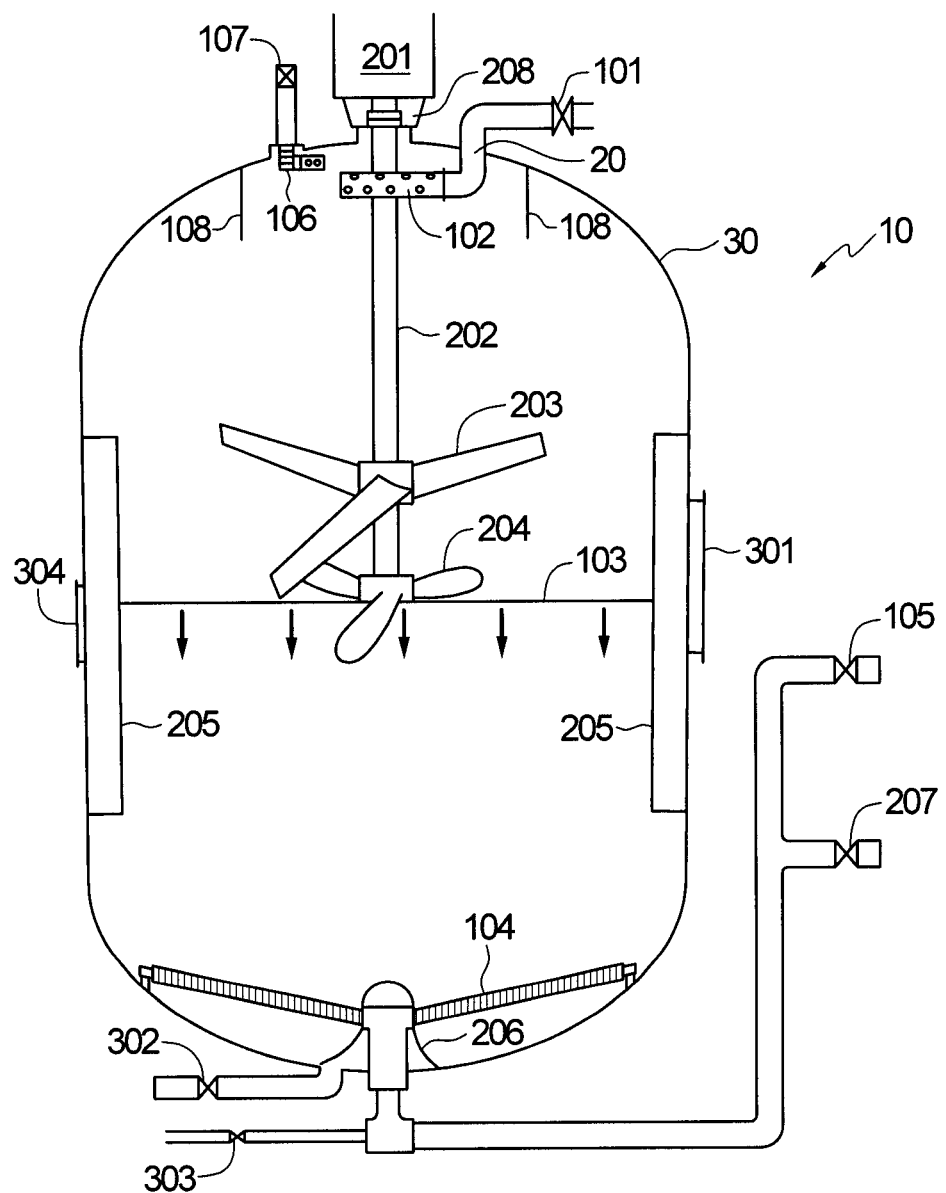
FIG. 1G is a side cross sectional view thereof, showing media and fluid motion in a settling process according to the invention.
Figure 1H:
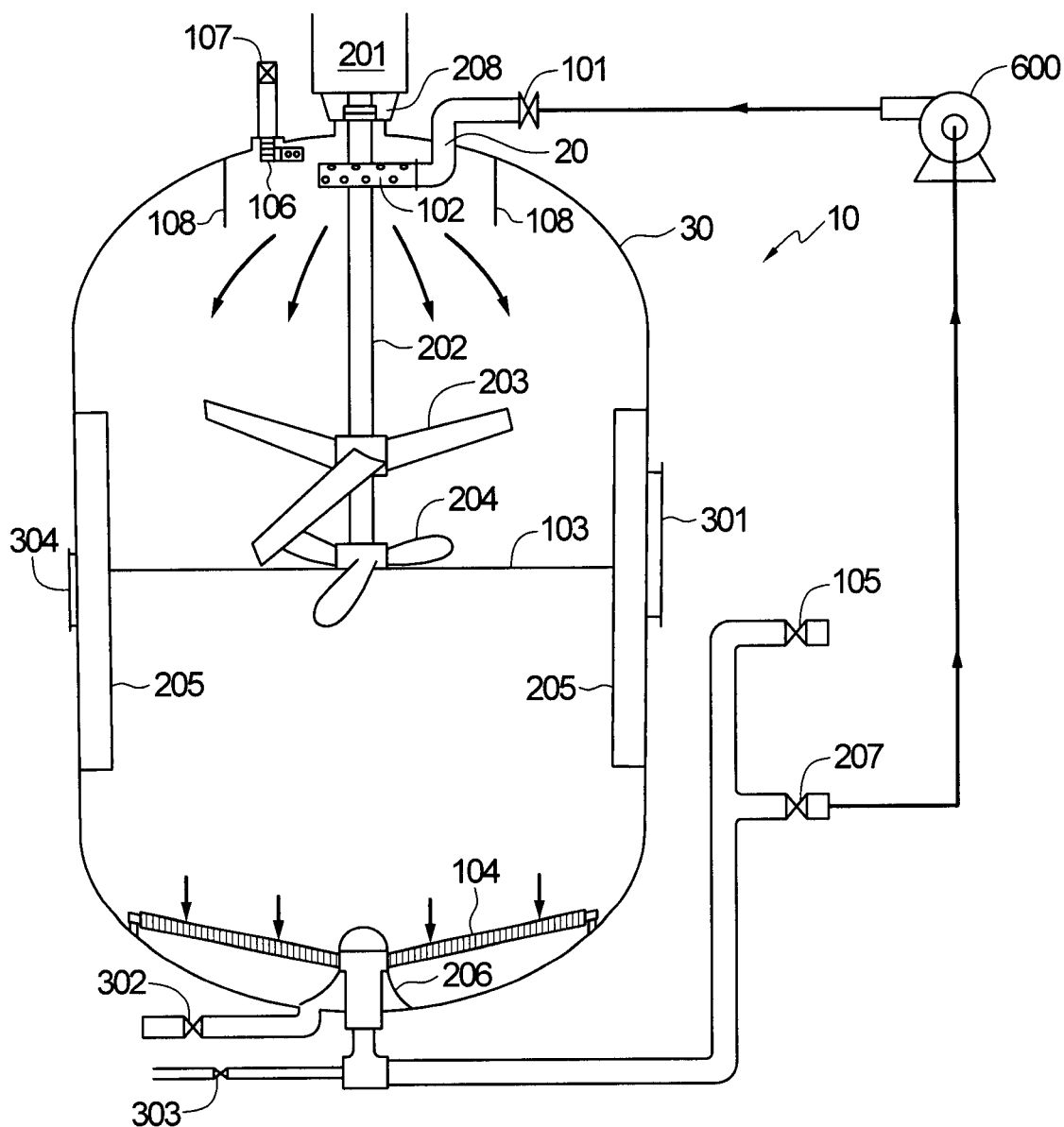
FIG. 1H is a side cross sectional view of an embodiment of the invention showing a purge and recycle process according to the invention.
Figure 2:
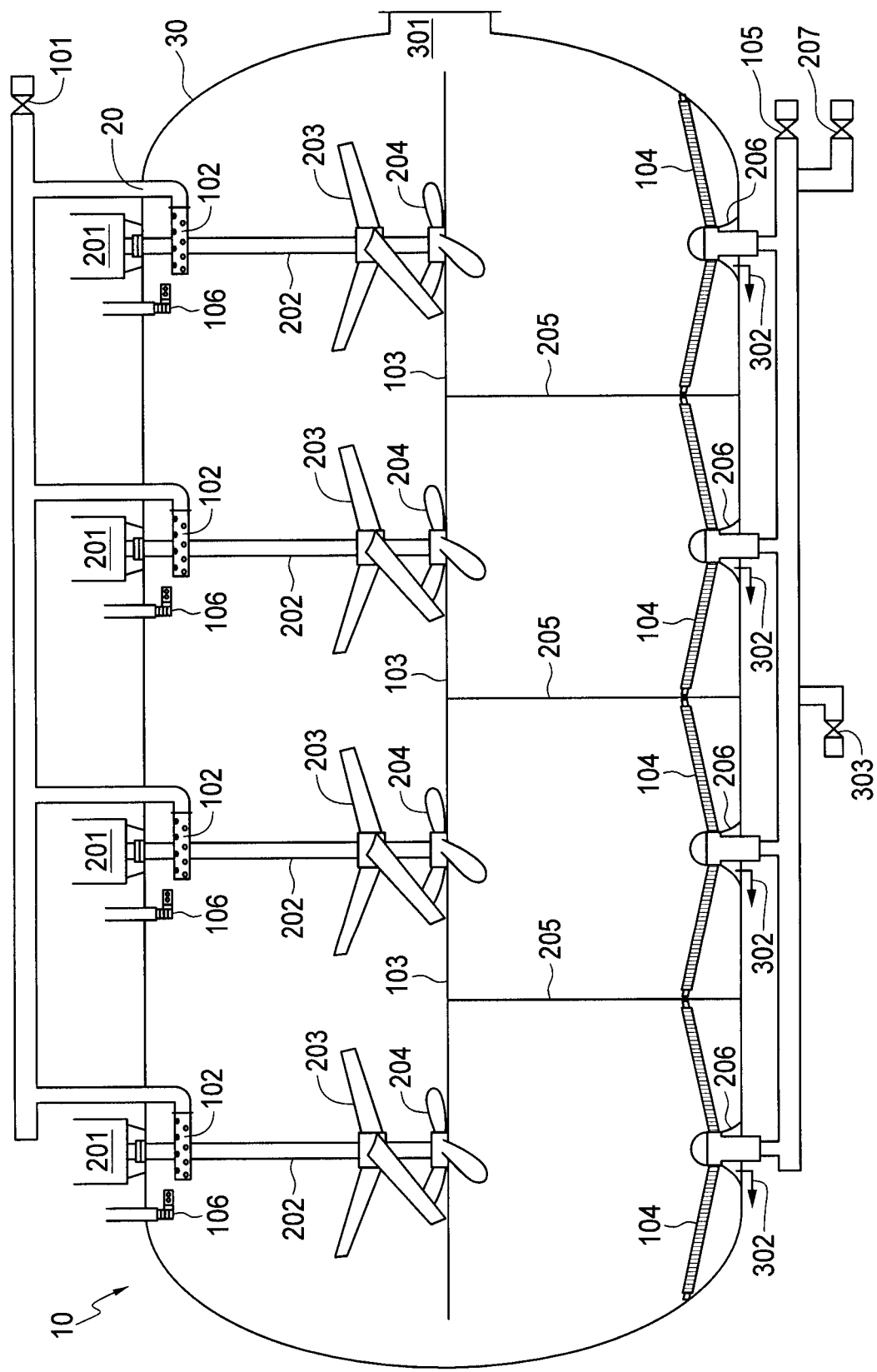
FIG. 2 is a side cross sectional view of an alternative embodiment of a filter system according to the invention showing the internal components thereof.

As shown in FIGS. 1 and 2, vertical filter 10 may have a standard down flow configuration, although a radial flow configuration can also be used as described below.

Filter 10 includes vessel 30 for containing the fluid and media. Inlet 20 is controlled by isolation valve 101 and is in fluid communication with a fluid source of contaminated fluid, such as a feed pump, a head tank, a pressurized vessel, a pond, a tailings pond, a reservoir, or a body of water. Nozzle 102 near the top of vessel 30 is positioned to receive fluid from inlet 20 and distribute the fluid in vessel 30. Vessel 30 is generally a vertical or horizontal pressure vessel to maximize bed holding capacities and contain gases that may be released to the atmosphere. Vessel 30 may be manufactured of steel, fibreglass, concrete, plastic combinations thereof, or other materials, depending on the application.

Filter media may be positioned in vessel 30, for example filling vessel 30 up to top level 103 prior to fluid entry. The type and size of the filter media in vessel 30 is dependent on the application but may be non-friable (i.e. resilient). Examples of media that could be used include walnut shell media such as eastern black walnut shells or English walnut shells, coconut shells, peach pits. Other media that could be used include mineral media such as sand, anthracite, and garnet, as well as in small concentrations and mixed with another media, such as carbons, granular plastics and ion exchange resins, although certain abrasive media, such as sand, anthracite, and garnet may not be appropriate in all situations. Some media may be mixed with a primary media for example a small concentration of activated carbon may be added to a non-friable media in order to be used and consumed in the filtration process and then discharged in the backwash dilution process.

Screen 104 is positioned near the bottom of vessel 30. Screen 104, may be a hub and spoke screen, in which the wedge wire screen is in each spoke, as shown in FIG. 1A, to allow for radial flow of the backwash slurry. Other configurations of screens may be used as long as they do not impede the slurry movement significantly. Screen 104 may be reinforced with internal axial beams to handle collapse and beam load forces. Below screen 104 is deflector 206. Two outlets, 360 and 365, are positioned proximate to the bottom of vessel 130. Valve 302 controls outlet 360, and outlet 365 is controlled by three valves, namely valve 105 for filter effluent, valve 303 which serves as a drain for maintenance purposes, and valve 207, allowing the fluid flow in the second outlet to be diverted to different locations such as a backwash holding tank or to re-enter the vessel through inlet 20. Valve 302 functions as a media drain and can be used to drain media or fluid from vessel 30 via a hose or the like from vessel 30.

Outlet 370 is positioned near the top of vessel 30 and is controlled by valve 107. Screen 106 is positioned to limit access to outlet 370. Slots in screen 106 may be sized to allow broken down fragments of media to pass while preventing the media in good condition from passing. Baffles 108 extending downwardly from the top of vessel 30 are positioned to contain both the entering fluid from nozzle 102 and the exiting fluid to outlet 370. Baffles 108 generally help contain the entering fluids (or those fluids exiting at the beginning of the backwash process, and in the discharge of lighter fluids and gasses) to a smaller portion of vessel 30.

Hatch 301 is a man-way allowing access into vessel 30. Fluid drain outlet 360 is positioned on the bottom side of vessel 30 and can be used to drain fluid from vessel 30 via a hose or the like. Glass window 304 may be present to allow users to view the interior of vessel 30, such as the media level and media slurry level.

Mixer 200 is present, including motor 201, which actuates and turns drive shaft 202 and thereby propellers 203 and 204 attached thereto. In some embodiments of the invention only one propeller may be present. In other embodiments, as described below, more than one mixer 200 may be present. Baffles 205 may be positioned along the sides of vessel 30 to direct fluid motion. In containment applications (e.g. when vessel 30 is a pressure vessel or contained tank) a mechanical seal 208 may be utilized.

Filter 10 can perform several processes, including filtration; filtration with discharge of light oil and gases; preliminary scrubbing; backwash dilution; settling; a purge/flush/recycle process; media removal; and service media fines removal. Table 1 below shows the activity of certain components of filter 10 during each of these processes.

TABLE 1

| Process Cycles | Valve 101 | Media | Valve 105 | Nozzle 102 | Screen 104 | Valve 107 | Motor 201 | Baffle 205 | Deflector 206 | Valve 207 | Valve 302 |
|---|---|---|---|---|---|---|---|---|---|---|---|
| Filtration | O | F | O | F | F | | | F | | | |
| Filtration w/Discharge Of Unwanted Light Oil & Gases | O | F | | F | F | O | | F | | | |
| Preliminary Scrubbing | | M | | | F | | M | F | F | | |
| Backwash Dilution | O | M | O | F | F | | O | F | F | O | |
| Settle | | | | | | | | | | | |
| Purge/Flush/Recycle | O | | | | F | | | | | O | |
| Media Removal | | | | | | | | | | | O |
| Service Media Fines Removal | O | M | | | | O | O | F | F | | |

In Table 1, "O" refers to the component being open, if a valve, or active, if a different component; "F" refers to fluid flow through or caused by the component; and "M" refers to a component in motion.

In the filtration process, as shown in FIG. 1C, fluid, such as contaminated fluid, enters vessel 30 through open valve 101. The fluid entering filter 10 is typically either from pressurized downstream equipment or pumped from holding tanks, clarifiers, ponds and the like. The contaminated fluid is generally water containing suspended contaminants but can also be a process fluid, coolant fluid, heat exchange fluid, liquid product-(food, industrial) or a gas in filtration that a fluid was used to regenerate (i.e. backwash) the contaminants out of the fluid. The fluid enters vessel 30 through inlet 20 after passing through isolation valve 101. The contaminated fluid is then distributed to the top of the vessel 30 through nozzle 102 which directs the fluid and reduces the flow velocity through many smaller holes than would a single opening. The contaminated fluid moves downwardly in vessel 30 until it reaches the top level 103 of the filter media within vessel 30.

The fluid then flows downwardly through the torturous path created by the media. The contaminants in the fluid are trapped in the negative pressure zones in and around the media, and in the interstices of the media. As the fluid flows downwardly it collects in and through under-drain screen 104 after passing through screen 104. Drain screen 104 may be a wedge wire screen sized with openings much smaller than the media. Alternatively, other types of screens, for example, mesh screens or perforated plates could be used. The cleaned water then passes out of vessel 30 to outlet valve 105. Flow rates into vessel 30 may be controlled, for example, by a variable frequency drive pump in front of filter 10, or by control valves, or orifice plates (not shown). The filtered fluid then passes through output 365 and valve 105.

In the filtration with discharge of light oil and gases process, as shown in FIG. 1D, the fluid entering vessel 30 via nozzle 102 includes floating or lighter components of the contaminated fluid such as gases or oil. Valve 107 is open in this process, to allow these floating or gaseous components to escape. Screen 106 has slots sized to allow broken down fragments from the slurry to pass through screen 106 and exit, which assists in maintenance of filter 10.

Once the filter 10 is full, or a pressure differential is exceeded, for example as measured by a pressure differential transmitter or a simple on off pressure switch, valve 107 opens for a period of time, for example two to five minutes, to discharge the unwanted light fluids and gases. Outlet valves 105, 302 303 and 207 are closed during this process.

The next process is preliminary scrubbing, as shown in FIG. 1E. In this process, motor 201 actuates and turns drive shaft 202 and propellers 203 and 204 attached thereto. In some embodiments of the invention only one propeller 204 is present. On difficult applications, such as highly viscous contaminants, for example oils and greases in the oil industry, industrial process waters, and food industry wash water, second propeller 203 may be present to provide more axial flow to push through the viscous contaminated media filter bed. Propellers 203 and 204 agitate the media, contaminants, and water, at a rapid rate, for example five to ten vessel volumes a minute, to provide homogenous slurry. The fracture point of the media should not be exceeded, so therefore the speed of propellers 203, 204 should be maintained under the fracture point, and sharp edges should be removed, otherwise excessive wear of the media may result. During this process no valves are open and the fluid remains in vessel 30.

In the backwash dilution process as show in FIG. 1F, motor 201 activates and propellers 203 and 204 propel the slurry radially. The slurry is also driven down to the vessel 30 floor to deflector 206 and some fluid passes through screen 104 (while most of the slurry will pass by media containment screen 104) outlet 365 to exit through valve 207. Media containment screen 104 therefore serves a dual purpose: in the filtration process, as described above, it keeps the media in place within the vessel; and in the backwash dilution phase, screen 104 keeps the media in place, and allows the slurry to exit vessel 30. The slurry passes across and by screen 104 during the backwash dilution process with enough velocity to prevent plugging the screen. Screen 104 should be suspended from above the bottom of vessel 30 to allow flow under screen 104.

As the slurry passes down to the bottom of the vessel 10 at a very high rate, it deflects off of deflector plate 206. The slurry then changes directions and flows radially outward. Baffles 205 deflect the slurry again and force the slurry to rise along the vessel 30 wall towards the top of vessel 30, after which the slurry falls towards propellers 203, 204. Baffles 205 help reduce the spin of the slurry. The slurry is also forced radially outward from propellers 203, 204.

Propellers 203, 204 promote greater axial flow of the slurry. For example, at the beginning of the backwash process the slurry may contain on average 5,000-10,000 mg/l of contaminants. As these contaminants in the liquid slurry pass across screen 104, some of the liquid portion of the slurry containing the contaminants is drawn through screen 104 while the media is retained in vessel 30. The contaminated fluid (without the media) travels through the piping and outside vessel 30 via valve 207. This process continues until most of the contaminants are removed. The equivalent fluid volume leaving valve 207 is made up by entrance of additional fluid through inlet valve 101. The backwash slurry should be processed at a rate of more than one vessel volume mixing per minute, otherwise channeling may occur, in which case the media may cement, and the backwash volumes will increase.

Once the contaminant concentration is significantly reduced (typically by more than 95%) valve 207 shuts and the settling process begins, as shown in FIG. 1G. Mixer 200 stops and the slurry settles to the bottom of vessel 30.

After a period of time, for example fifteen to thirty seconds, valve 207 reopens to start purge/flush/recycle process, as shown in FIG. 1H, for 10-20 seconds to flush contaminants from the lower portion of vessel 30. If a higher level of immediate clean water is required after the backwash process is complete, the filter 10 can direct the flow from valve 207 to the inlet piping 101 via a feed pump 600. The filter 10 can then start the filtration process again wherein valves 101 and 105 are open, all other valves closed, the mixer 201 is off, and valve 107 is periodically open.

Filter 10 thus provides a less complex and therefore more affordable solution. Filter 10 is durable and can handle industrial applications. An advantage of filter 10 is that it uses less backwash volume than a conventional reverse flow backwash or gas scour backwash filter. Filter 10 is easy to service, as the internal components are easily accessible.

FIG. 2 shows an alternative embodiment of the invention in which vessel 38 is considerably larger than vessel 30, and several components are reproduced. Baffles 205 are used to split vessel 38 into a number of "chambers" with propellers 203, 204 above each chamber. Each chamber also has inlet and outlet systems as described with reference to FIG. 1A.

Figure 3:
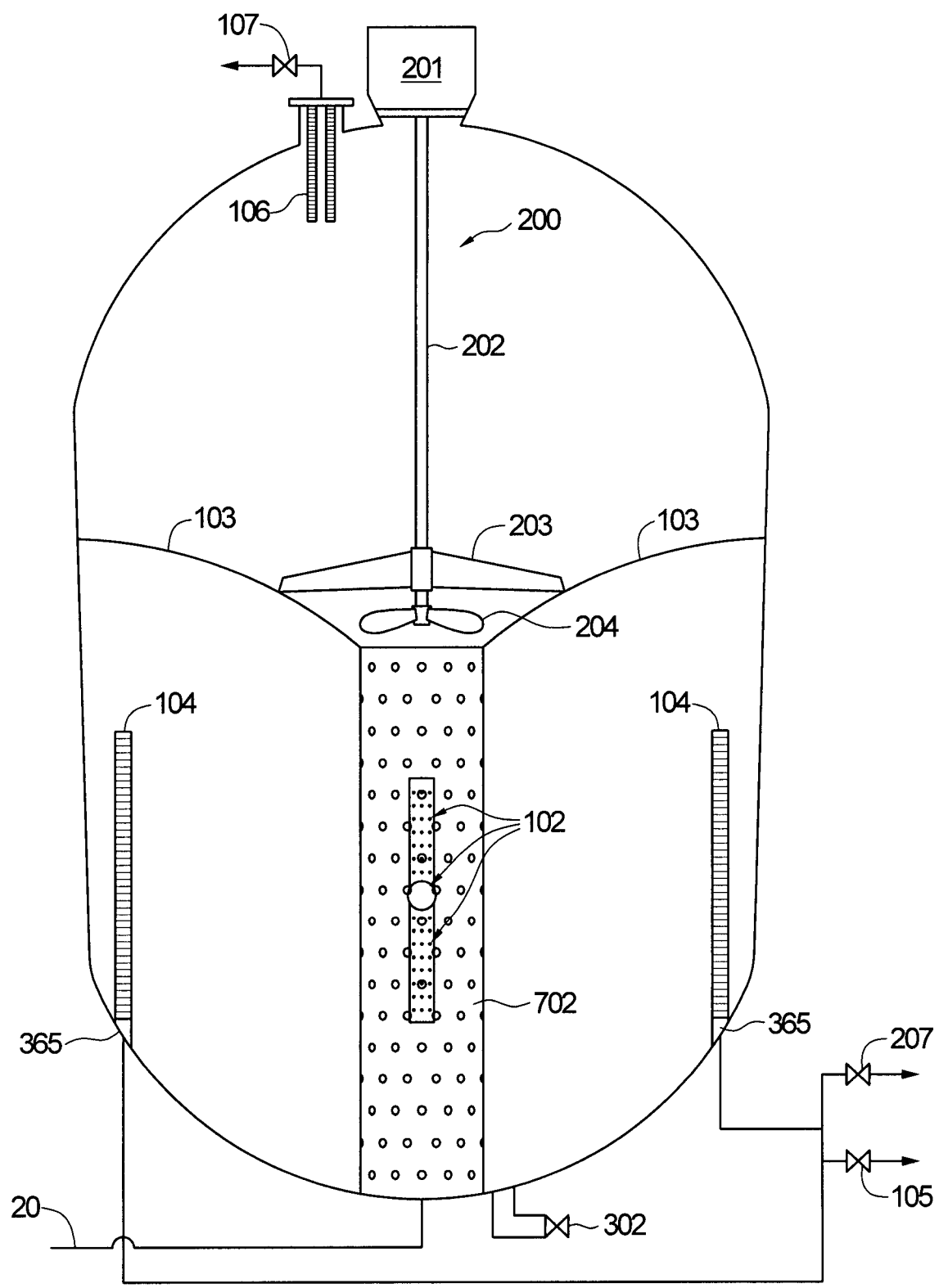
FIG. 3 is a side cross sectional view of an alternative embodiment of a radial flow filter system according to the invention showing the internal components thereof.

In an alternative embodiment of the invention, a radial flow configuration can be used, as shown in FIG. 3. In such a configuration nozzle 102 is positioned centrally in vessel 30 and the fluid enters vessel 30 via inlet 20 which leads the fluid to nozzle 102. Nozzle 102 is outside of central filter retainer assembly 702 which is perforated for distribution of radial flow. The contaminated fluid exits nozzle 102 and moves outwardly through the media to screens 104 vertically positioned on the periphery of the vessel close to the inside edges of vessel 30. Outlets 365 are positioned beneath screens 104. The filter effluent discharges from vertical screens 104 in this embodiment in a similar fashion as it does the horizontal screens shown in FIGS. 1 and 2. In both embodiments screens 104 act as backwash dilution screens in the backwash dilution process (as shown in FIG. 1F).

Figure 4:
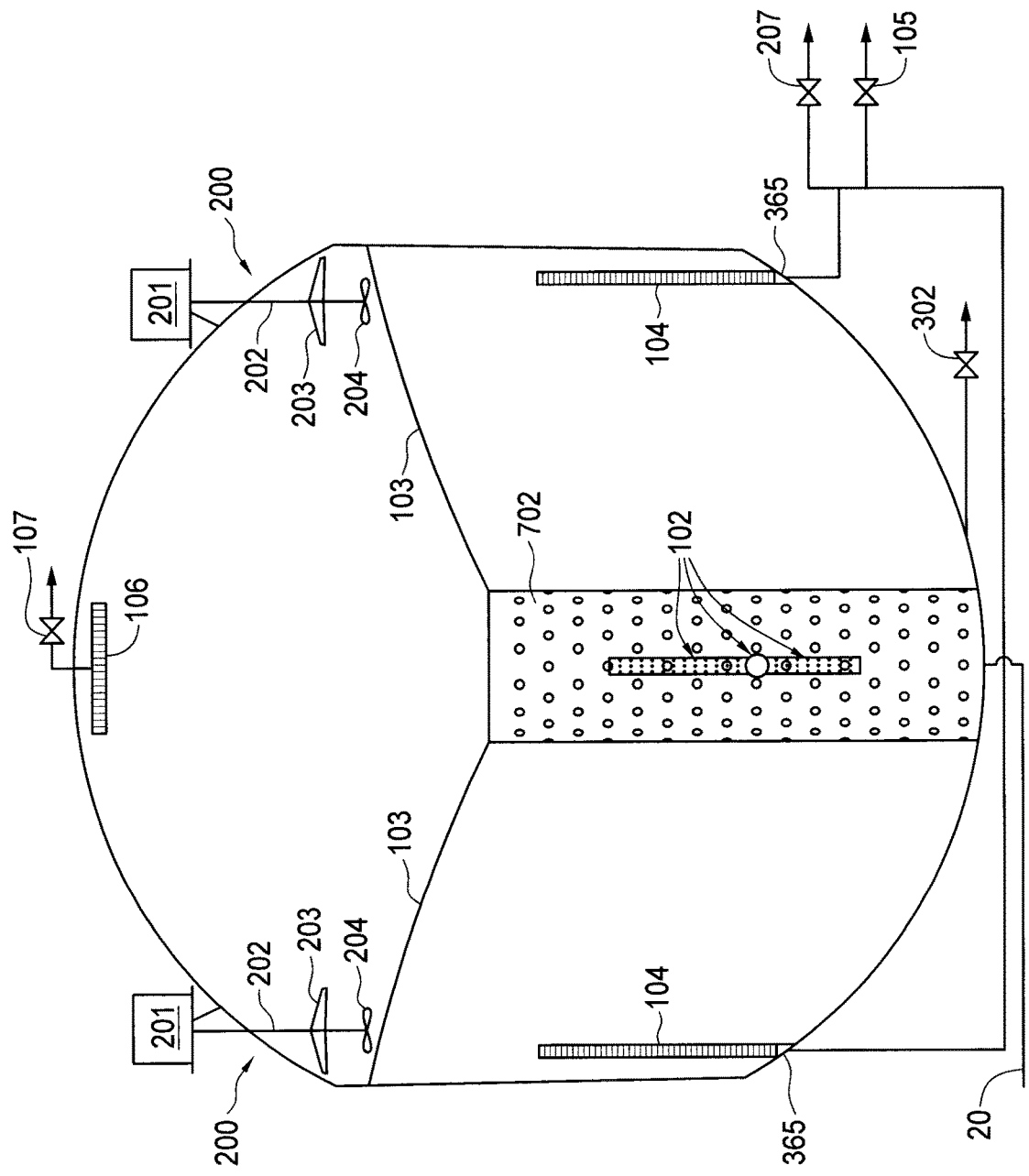
FIG. 4 is a side cross sectional schematic view of an alternative embodiment of a large radial flow multi-mixer filter system according to the invention showing the internal components thereof.

FIG. 4 shows an alternative embodiment of the invention having large radial flow units with a plurality of mixers 200. One or several mixers 200 could be used to slurry the radial flow system in this embodiment. Alternatively, one or more mixers 200 could be positioned vertically within vessel 30; the number and location of mixers 200 can be dependent on the size and configuration of the particular filter 10.

Figure 5:
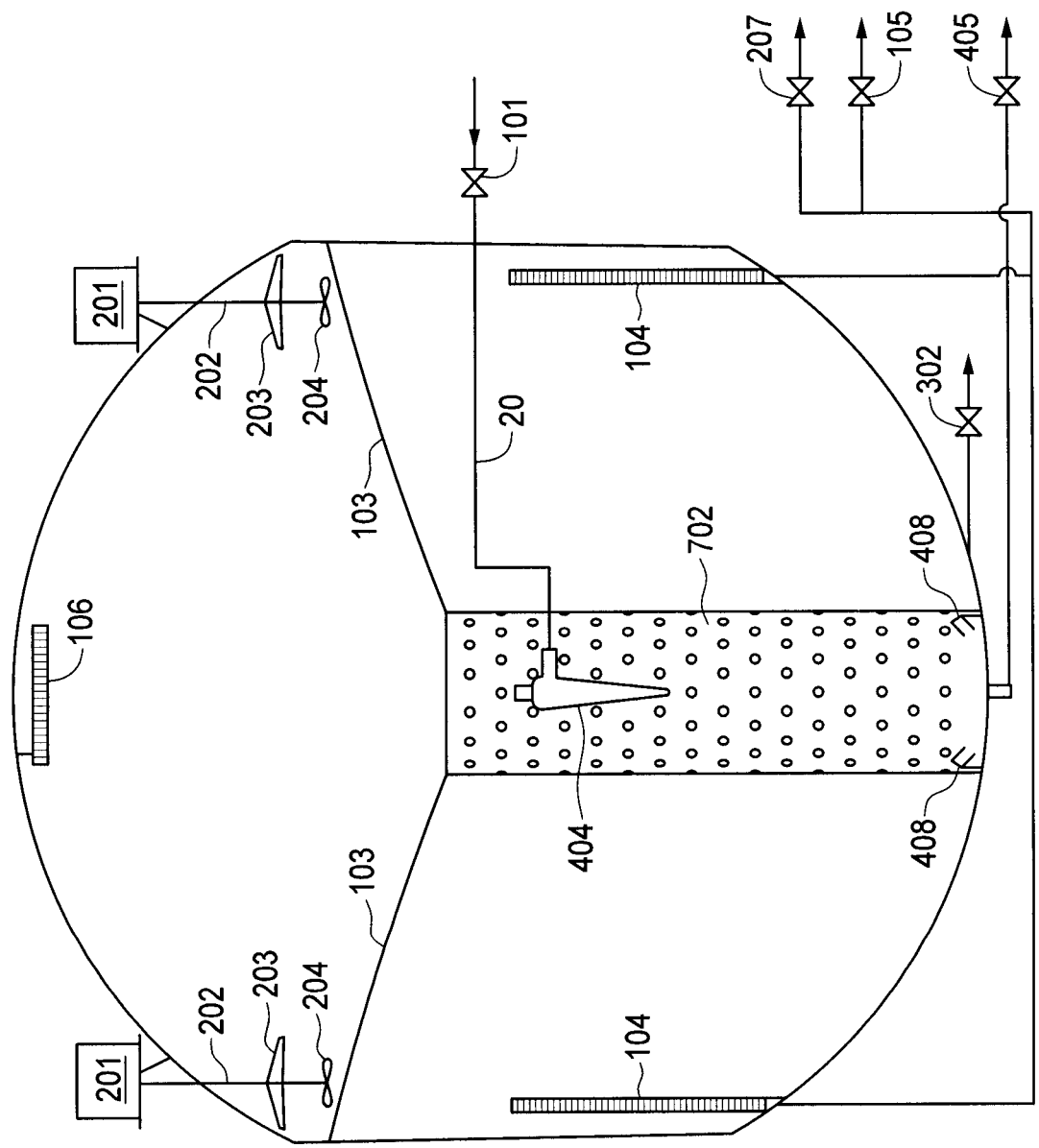
FIG. 5 is a side cross sectional schematic view of an alternative embodiment of the invention of a large radial flow filter system having a cyclone, and showing the internal components thereof.

Another alternative embodiment of the invention is shown in FIG. 5. Cyclone 404 is positioned at the end of inlet 20. Central filter retainer assembly 702 assists in keeping the filter media radially outward from the inlet area. Cyclone 404 is particularly useful when high concentrations of oil or solids are required to be removed from contaminated fluids. Cyclone 404 is a hydro-cyclone that reduces the area required to separate solids/contaminants in the contaminated fluid from the lighter fluids therein (such as water and oil). The accumulated solids and contaminants fall slowly to the bottom of vessel 30 where they accumulate over time. The solids and contaminants can be periodically removed through outlet 302 and valve 405 when required. A monitor or sensor can be installed to warn of high accumulations of solids and contaminants. Agitation nozzles 408 can be installed throughout vessel 30 to help slurry the accumulated media and the solids and contaminants. Agitation nozzles 408 generally receive utility water from available sources.

In operation, contaminated fluid flows through input 20 into vessel 30. If high concentrations of oil and/or solids are present in the contaminated fluid then cyclone 404 should be used. If the concentration of contaminants is low a standard perforated nozzle 102 can be used (the water velocity is reduced by using nozzle 102). In either case, the fluid then flows radially outward toward screens 104, which act as clean effluent screen. The fluid passes though the filter media on route to screens 104. As the fluid passes through the media it is cleaned as described previously. Once the media becomes fully contaminated with fine contaminants outlet valve 105 can be closed. The backwash sequence can then be completed as previously described.

Figure 6A:
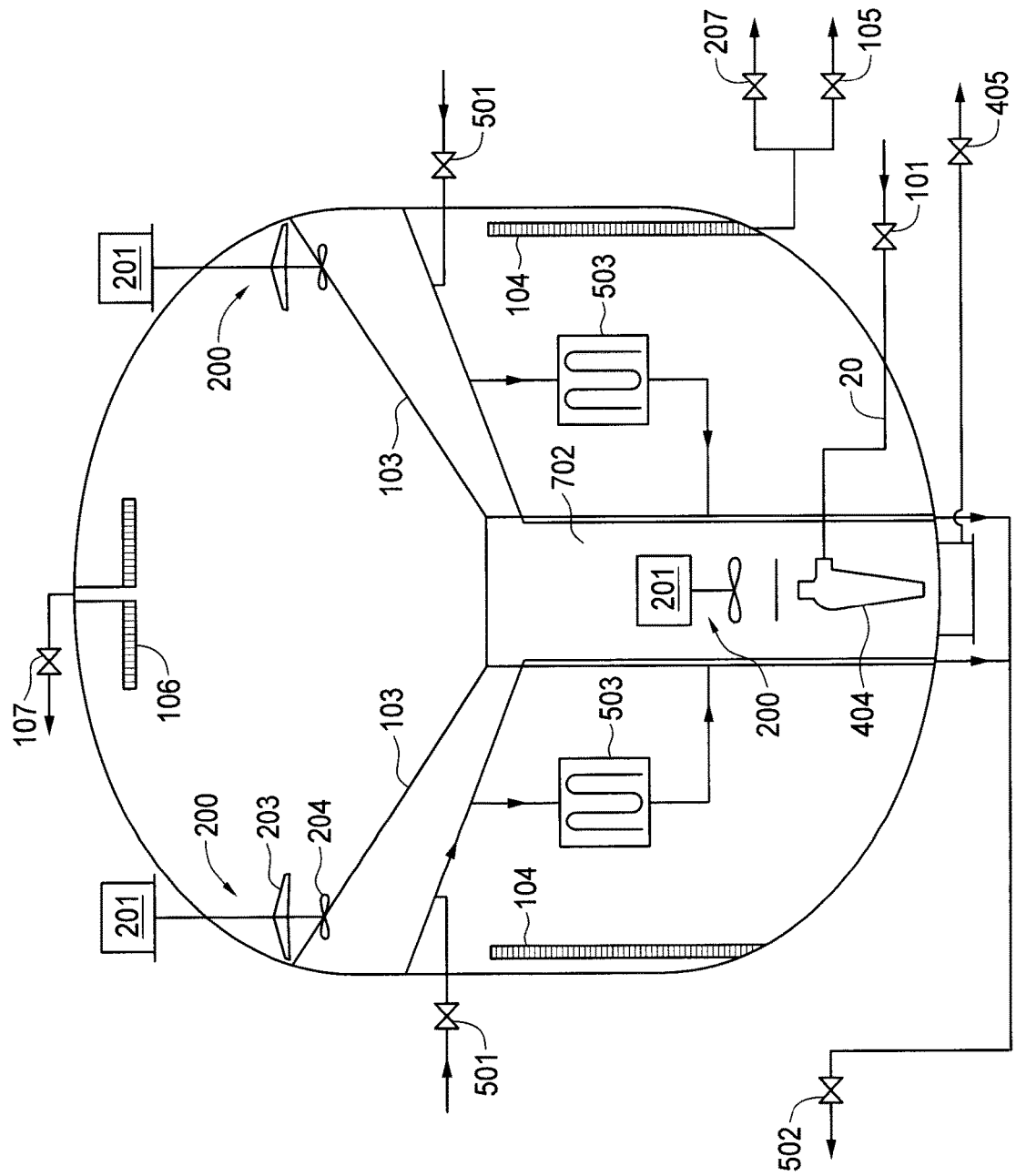
FIG. 6A is a side cross sectional schematic view of an alternative embodiment of a radial flow with heat exchanger filter system according to the invention showing the internal components thereof.
Figure 6B:
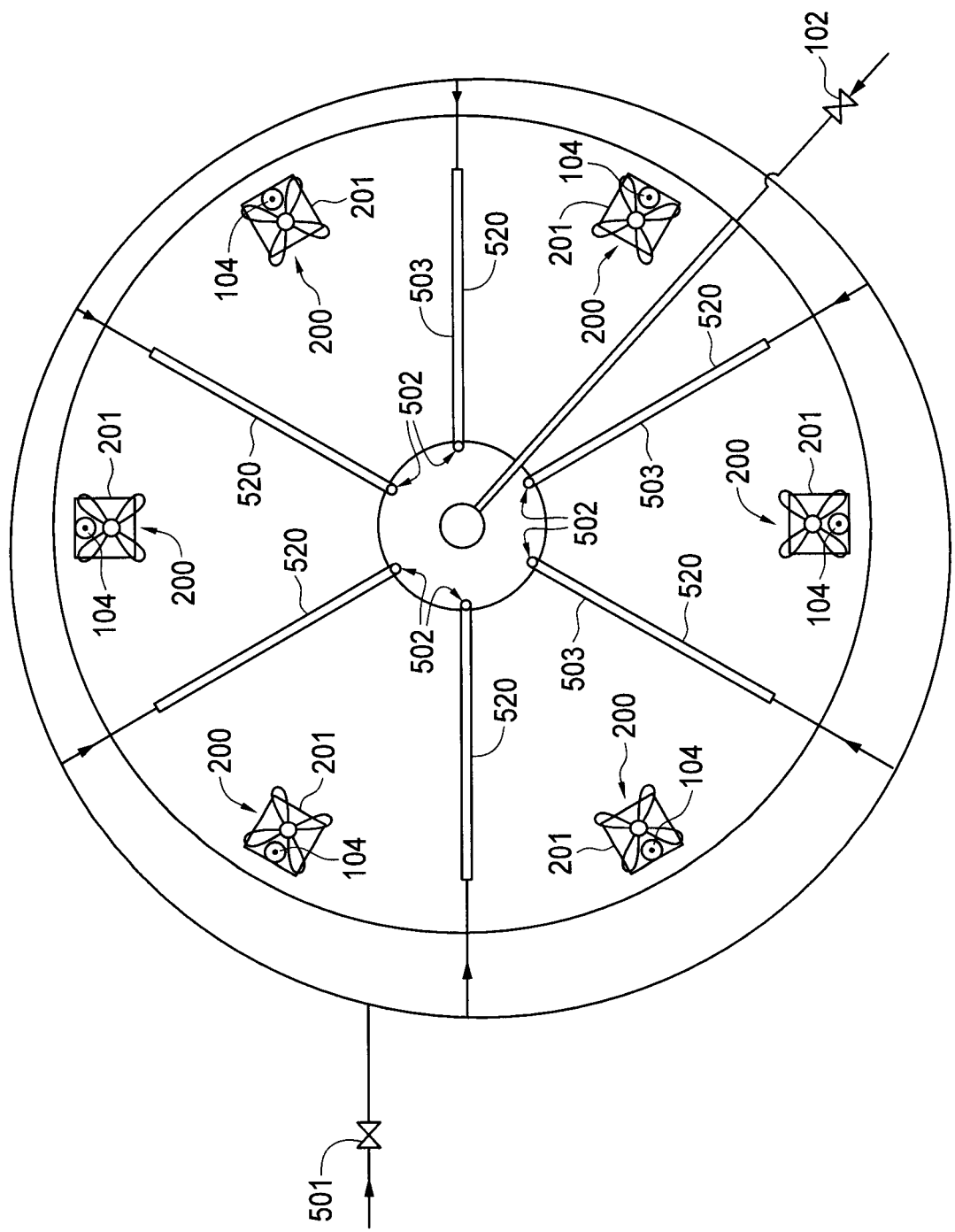
FIG. 6B is a top cross sectional view thereof.

In the embodiment shown in FIGS. 6A and 6B, filter 10 can clean fluid while exchanging energy in the form of heat transfer. The filter media allows for a differential pressure of the transfer fluid as well as cleaning the dirty process water.

Figure 6C:
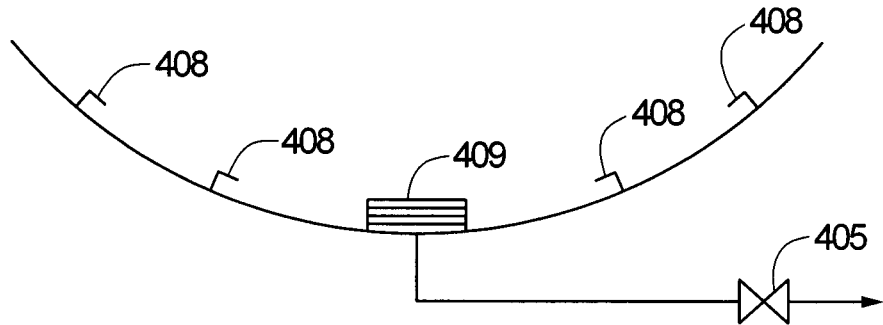
FIG. 6C is a side view of a portion thereof, showing a solid drain system therefor.
Figure 6D:
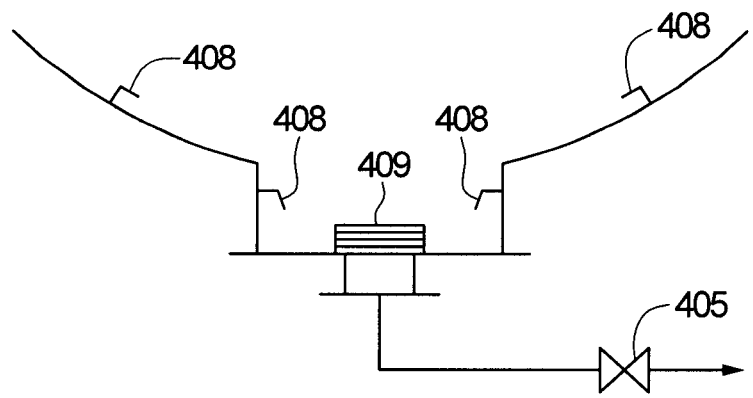
FIG. 6D is a side view of a portion thereof showing alternative embodiment of a solid drain system therefor including a sump.
Figure 6E:
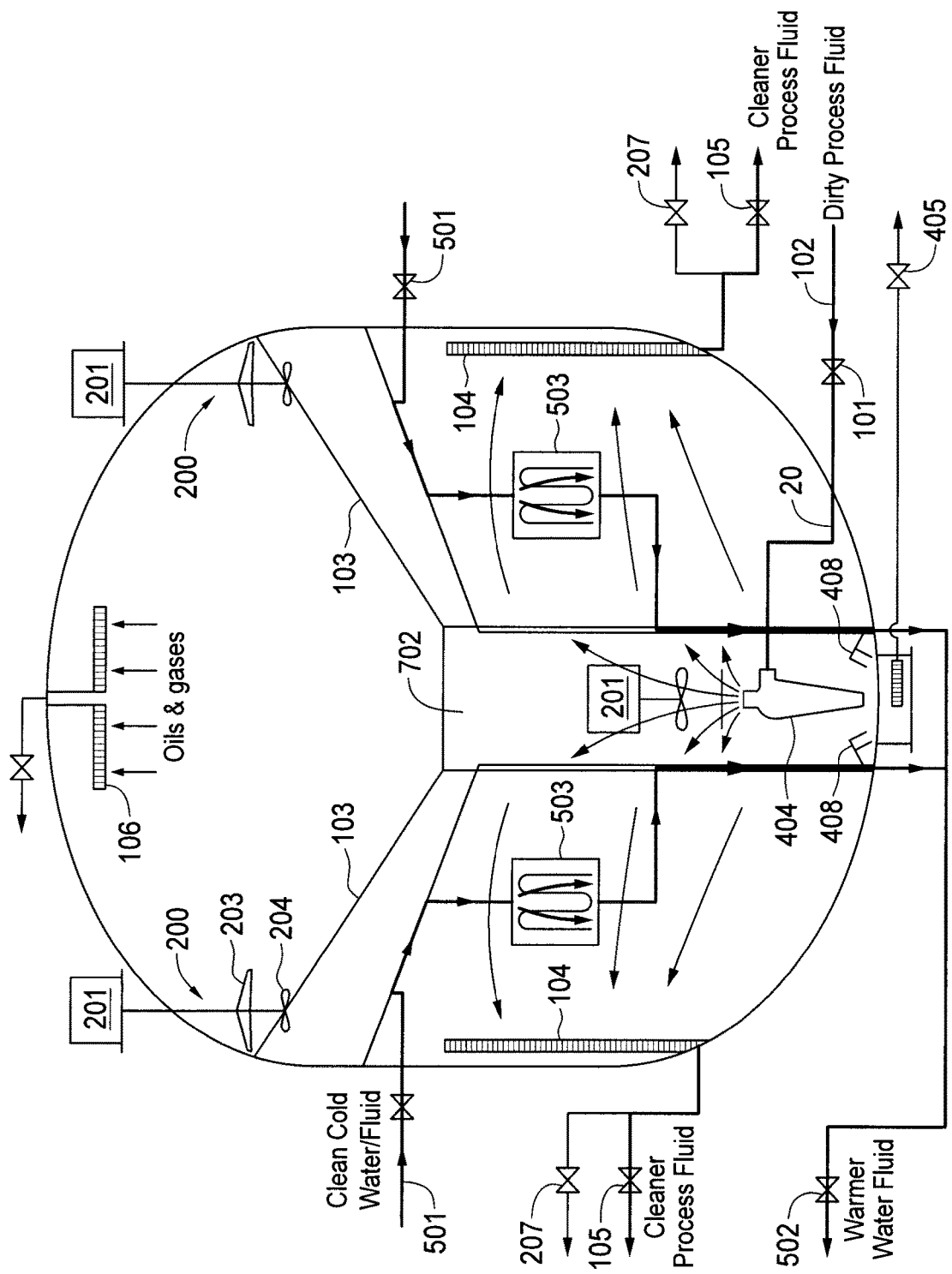
FIG. 6E is a side cross sectional view of the filter system of FIG. 6A showing the fluid motion therein.

In operation, as shown in FIG. 6D, contaminated fluid enters vessel 30 through inlet 20 and valve 102. The water passes through cyclone 404 to reduce concentrations of high density contaminants. Oils, gasses and lighter fluids may travel upwards (according to Stoke's law) to screen 106 where they can be removed and heavier contaminants may fall to screen 409. The contaminated fluid passes radially outward and is cleaned by the media as it passes. The cleaned fluid passes through clean effluent screens 104 and out of clean discharge valve 105. A mixer 200 may be placed within central filter retainer 702 to assist preventing media from accumulating in central filter retainer 702 and to further agitate the slurry being formed. Mixer 200 may be submersible, or alternatively could be placed on the side of vessel 30.

Clean process fluid from applications such as thermal heavy oil (SAGD steam floods), mining heavy oil with large volumes of process water (tailing ponds), food processing with wash waters and process waters, hot laundry waters, fabric dye house effluent, meat packing, paper mills, or industrial process water enters the vessel through inlet passage 501 in generally the opposite direction of the contaminated fluid. Heat exchanger 503 can include a number of heat exchange surface mediums or materials, for example water, glycol, alcohol, or stainless steel, hastelloy or alloys. As shown in FIG. 6B high surface area exchange panels 520 increase the surface area of the heat exchanger 503, but pipe and other exchange media can be used instead of panels dependant on the heat transfer required. The clean process fluid that enters at inlet 501 discharges through heat exchange outlet 502 near the contaminated fluid inlet 20. The flow rates may be dependent on the amount of heat exchange required for both the clean process fluid from 501 and the contaminated fluid inlet 20.

In the backwash/regeneration process the clean process water is stopped at valves before entering inlet 501. The filter is regenerated as previously described whereby valve 107 is opened to discharge lighter oils and gasses until they are eliminated from the vessel, then valves 101 and 105 are closed. Mixers 200 start and create an internal scrubbing slurry. Screens 104 acts as concentrated backwash water discharge screen and concentrated dirty water from the slurry is discharged through valve 207. One or more mixers 200 can be used. Vessel 30 may be open if the contaminated fluid is below its boiling temperature and when fugitive emissions are not present. The scrubbing action of the media also cleans the surface of the heat exchanger 503 panels or pipes or other heat exchange material. This cleaning improves the exchange performance and reduces potential chemical cleaning costs. Sludge drainage may be conducted periodically or at other times constantly if the amount of heavy contaminants warrants continual discharge. FIGS. 6C and 6D show two different embodiments of a solid drain system. As shown in these figures, agitation nozzles 408 may be present to move the slurry. Screen 409 is sized to allow only heavy contaminants of up to a predetermined size to pass through to valve 405. As shown in FIG. 6D a sump may be used to assist in fluid drainage.

The pressure differential created as the contaminated fluid flows through the media allows for uniform distribution of the contaminated fluid as it flows by heat exchanger 503. The backwash dilution process can remove the contaminants and scrub heat exchange 503 surfaces clean.

The filters and methods disclosed herein have a number of practical applications. For example, they could be used in the oil and gas industry, such as fracking or SAGD, or in mining and industrial laundry applications.

The above-described embodiments have been provided as examples, for clarity in understanding the invention. The filter according to the invention may be operated manually or electronically. A person with skill in the art will recognize that alterations, modifications and variations may be effected to the embodiments described above while remaining within the scope of the invention as defined by claims appended hereto.

I claim:

1. A method of filtering contaminants from contaminated fluid, comprising:
    a) flowing contaminated fluid into a vessel containing media, the contaminated fluid entering the vessel through an input positioned near a top of the vessel;
    b) passing the contaminated fluid through the media to trap the contaminants therein until a predetermined differential pressure is detected across the media and a drain screen to retain the contaminated media in the vessel and to collect decontaminated fluid under the drain screen;
    c) draining the decontaminated fluid from the vessel;
    d) once the predetermined differential pressure across the media is detected, scrubbing the contaminated media by flowing water into the vessel through the input, and forming a slurry of the contaminated media and the water by activating first and second propellers rotatable on a drive shaft extending downwardly from the top of the vessel, the first and second propellers increasing axial flow of the slurry through the drain screen to a deflector plate below the drain screen, the deflector plate deflecting the slurry radially outward; wherein a liquid portion of the slurry containing the contaminants is drawn through the drain screen and drained from the vessel while the media is retained in the vessel, the drain screen thereby separating the contaminants from the media and the slurry;
    e) deflecting the slurry to flow upwardly back to the first and second propellers using a plurality of baffles positioned on side walls and the top of the vessel; and
    f) repeating processes (d) and (e) until the contaminants are removed from the media.

2. The method of claim 1 wherein the input is positioned centrally in the vessel to allow the contaminated fluid to flow into the vessel from a central position within the vessel and to move outwardly from a center of the vessel.

3. The method of claim 1 wherein lighter contaminants and media fragments are removed from the vessel via a second screen and an outlet near the top of the vessel.

4. The method of claim 1, further comprising deactivating the first and second propellers to allow the slurry to settle to the bottom of the vessel and flushing the contaminants from the bottom of the vessel.

\* \* \* \* \*